(12) United States Patent  (10) Patent No.: US 8,534,276 B2
Palumbo et al.  (45) Date of Patent: Sep. 17, 2013

(54) TEA KETTLE

(76) Inventors: John L Palumbo, Wyckoff, NJ (US);
Stephen A Boyd, Manhasset, NY (US)

( * ) Notice: Subject to any disclaimer, the term of this patent is extended or adjusted under 35 U.S.C. 154(b) by 143 days.

(21) Appl. No.: 13/021,768

(22) Filed: Feb. 6, 2011

(65) Prior Publication Data
US 2012/0090813 A1   Apr. 19, 2012

Related U.S. Application Data

(60) Provisional application No. 61/394,296, filed on Oct. 18, 2010.

(51) Int. Cl.
*A47J 27/02* (2006.01)
(52) U.S. Cl.
USPC ..... 126/390.1; 126/344; 126/373; 126/373.1; 126/376; 126/376.1
(58) Field of Classification Search
USPC .................. 126/344, 373.1, 390.1, 373, 376, 126/376.1
See application file for complete search history.

(56) References Cited

U.S. PATENT DOCUMENTS

| | | | | |
|---|---|---|---|---|
| 1,397,536 A | * | 11/1921 | Moork | 126/376.1 |
| 1,827,131 A | * | 10/1931 | Austin | 126/392.1 |
| 5,367,607 A | * | 11/1994 | Hufnagl et al. | 392/465 |
| 5,373,836 A | * | 12/1994 | Mifune et al. | 126/376.1 |
| 7,548,428 B2 | * | 6/2009 | Lev et al. | 361/700 |

OTHER PUBLICATIONS

Esmail M. A. Mokheimer, International Journal of Heat and Mass Transfer 45 (2002) 3631-3642).*

* cited by examiner

*Primary Examiner* — Kenneth Rinehart
*Assistant Examiner* — Gajanan Prabhu
(74) *Attorney, Agent, or Firm* — Jon Fallon, Esq.

(57) ABSTRACT

Embodiments of the present invention relate to an improved kettle using conduction and convection, yielding improved boiling efficiency and methods of making the same. In one embodiment, a tea kettle comprises a handle, a spout, and a voluminous container having at least one passageway positioned about an outer surface of an inner containment wall of the voluminous container, for allowing a heated fluid to pass therethrough and conductively heat the inner containment wall. In another embodiment, a tea kettle comprises a voluminous container comprising an inner containment wall having a surface comprising a plurality of curves, and an outer wall having a surface comprising a plurality of curves, wherein at least one passageway is defined between an outer surface of the inner containment wall and an inner surface of the outer wall, for allowing a heated fluid to pass therethrough and conductively heat the inner containment wall.

13 Claims, 3 Drawing Sheets

US 8,534,276 B2

TEA KETTLE

CROSS-REFERENCE TO RELATED APPLICATIONS

This application claims priority to provisional patent application Ser. No. 61/394,296, filed Oct. 18, 2010, entitled "Conductive-Convective Tea Kettle Improved Boiling Efficiency," the disclosure of which is incorporated by reference herein in its entirety.

BACKGROUND

1. Field of the Invention

Embodiments of the present invention are generally related to a vessel that heats liquid. More specifically, embodiments of the present invention relate to a kettle that takes advantage of conductive and convective modes of heat transfer improving boiling efficiency while reducing energy requirements for heating said volume of liquid and methods of making the same.

2. Description of the Related Art

Evidence of teas and heated, steeped beverages brewed with heated water has been found dating back as early as 8,000 years ago. This simple process is remarkably fuel-intensive, since the heat capacity for water is the highest of any commonly found liquid, at $4.186 \text{ J·g}^{-1}$. While metallurgic advances appeared to have serendipitously advanced the efficiency of simple boiling vessels (knowing that thermal conductivity coefficients were not documented until at least the late 1700s-early 1800s), little has changed in terms of design.

With fuels of all kinds becoming increasingly scarce, the increasing demands of modern societies, the skyrocketing global population increase and the inherently finite nature of fuel materials themselves, it is becoming increasingly necessary to drive most aspects of modern society toward greater efficiencies on all levels. Most First-World governments openly acknowledge these facts, and most are cognizant that many incremental increases in system efficiencies are often easier to achieve than a few, large, so-called "discontinuous," society-wide adoptions of energy efficiency such as moving to nuclear power. Innumerable examples of these incremental increases in efficiency can be found on the market, including many familiar smaller devices now being powered by solar cells, extremely efficient lithium-ion batteries and the like.

Because of the huge popularity of steeping and brewing worldwide—for example, $7.4 million in tea kettle sales in 2009 in the United Kingdom alone—it would be very advantageous to appeal to increasingly ecologically aware markets. To date, however, no commercially available tea kettle appears to be available which exploits both simple and advanced scientific principles to increase the efficiency of this energy-demanding process.

Thus, there is a need for a tea kettle design having greater heating efficiency, and in particular, utilizing increased surface area an improved heat-transfer means.

SUMMARY

Embodiments of the present invention are generally related to a vessel that heats liquid. More specifically, embodiments of the present invention relate to a kettle that takes advantage of conductive and convective modes of heat transfer improving boiling efficiency while reducing energy requirements for heating said volume of liquid and methods of making the same.

In one embodiment of the present invention, a tea kettle comprises a handle, a spout, and a voluminous container having at least one passageway positioned about an outer surface of an inner containment wall of the voluminous container, for allowing a heated fluid to pass therethrough and conductively heat the inner containment wall.

In another embodiment, a tea kettle comprises a voluminous container comprising an inner containment wall having a surface comprising a plurality of curves, and an outer wall having a surface comprising a plurality of curves, wherein at least one passageway is defined between an outer surface of the inner containment wall and an inner surface of the outer wall, for allowing a heated fluid to pass therethrough and conductively heat the inner containment wall.

A method of heating water comprises providing a tea kettle comprising a handle, a spout, and a voluminous container having at least one passageway positioned about an outer surface of an inner containment wall of the voluminous container; filling an interior volume of the voluminous container with liquid; placing a bottom surface of the tea kettle on a heat source; allowing heated air, proximate the heat source, to pass through the at least one passageway and conductively heat the inner containment wall, conductively heating the water.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
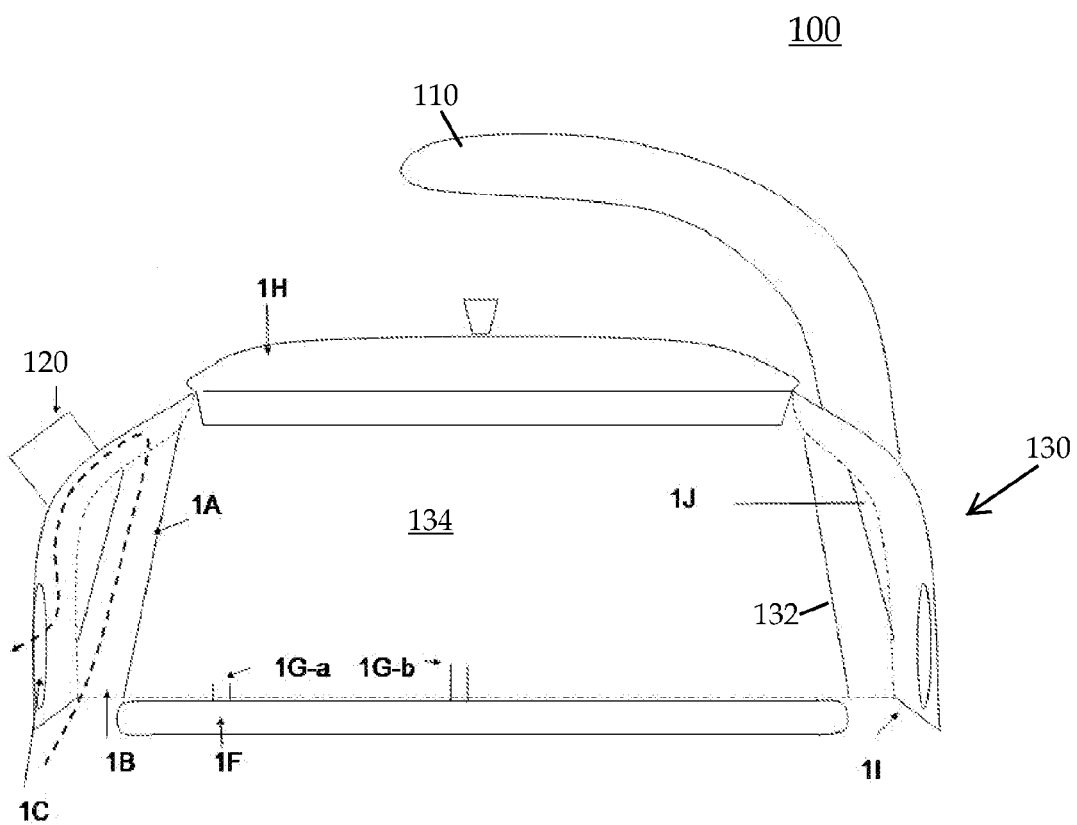
FIG. 1 depicts a cross-sectional view of a tea kettle in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are generally related to a vessel that heats liquid. More specifically, embodiments of the present invention relate to a kettle that takes advantage of conductive and convective modes of heat transfer improving boiling efficiency while reducing energy requirements for heating said volume of liquid and methods of making the same.

As used herein, the term "kettle" or "tea kettle" may refer to any type of vessel used to heat fluids, as readily understood by one of ordinary skill in the art. Furthermore, any discussion of particular types of vessels herein should be understood to be for exemplary purposes only, and embodiments of the present invention encompass numerous variations thereof, including any type of liquid-heating vessel.

The term conductivity or fluid-medium-fluid heat transfer is the first of three means of dramatically improved heating demonstrated by embodiments of the present invention, in particular, the embodiment depicted in FIG. 1. FIG. 1 depicts a cross-sectional view of a tea kettle in accordance with one embodiment of the present invention. A tea kettle 100 generally comprises a handle 110, a spout 120, and a voluminous container 130. In the embodiment shown, the voluminous container 130 comprises a plurality of pipes 1A positioned radially around an outer perimeter of an inner containment wall 132 of the tea kettle. In many embodiments, the plurality of pipes 1A are equally spaced around the outer perimeter.

The tea kettle 100 may be manufactured out of any common tea kettle materials (e.g., metals), which have good thermodynamic properties suitable for embodiments of the present invention. Similarly, the tea kettle 100 may be made in any reasonable size, suitable for embodiments of the present invention. Due to the consumer nature of some commercial embodiments of the present invention, the material selection and size requirements may be based on both cost and convenience constraints. However, embodiments of the present invention should not be limited to any material, size or other restrictive commercial parameter, unless expressly set forth herein.

In one embodiment, during operation of the tea kettle, gases which may be heated proximate the flame or electric element (or alternatively, produced by it) are naturally infused into the tea kettle 100 by means of an inlet port 1G-a. In many embodiments, the inlet port may comprise a substantially oval or circular cross-section. The heated gas is directed by a connection path 1I, sealing off the empty space 1J so that the hot gas may not simply be directed out of the outlet port 1C.

In certain embodiments, attention is paid to the decrease in resistance to gas flow by changing the volume occupied by the gases as they travel through the structure to enhance convection of the gases so that they may conductively transfer their heat. Inlet 1B and outlet ports 1C for the influx and efflux of the gas are shown in FIG. 1, and a general flow pathway of heated gases is depicted with the dashed line.

In many embodiments, the tea kettle 100 further comprises a lid 1H covering an opening into an interior volume 134 of the voluminous container 130. Optionally, the lid 1H may create a form-fitting seal to maintain a small, but significant, heat gain. Similarly, an optional spout cover (not shown) may also be utilized, whereby heat is further trapped to aid efficiency.

As shown in FIG. 1, pipes 1F may be positioned along the bottom of the voluminous container 130. The pipes 1F may be presented in either a coil or some linear combination of straight or coiled segments. For example, as shown, the pipes 1F represent tubing positioned in a spiral configuration (about the z-axis), parallel with the base of the voluminous container, affixed to its base, with inlet 1G-a port or ports and outlet 1G-b port or ports directly into the interior volume 134, creating an open system between the pipes 1F and a fluid to be heated contained in the voluminous container 130.

As experienced with embodiments of the present invention, the structure as identified herein allows for convective heating—i.e., the pressure and temperature differential on the inner part of the spiral (in comparison to the outer), caused by heat gradient induced by unequal absorption of heat, combined with slightly different heights away from the base for the inlet ports 1G-a and outlet ports 1G-b induces turbulent flow rapidly. As such, the liquid (e.g., water) proximate the inlet ports 1G-a is heated at such rapid rate, the liquid may be superheated which instantly liberates its heat to the cooler water mass within the interior volume 134.

Inlet ports 1G-a and outlet ports 1G-b may be established at different heights away from the base in order to take advantage of the differences in density of the liquid as a function of temperature. For example, a super heated liquid is created at dr=dRmax inside the coil, where dr is defined as the cross-sectional radial differential for the tubing, and dR is defined as radial differential of the spiral shape itself, curling around the z-axis of the kettle. The combination of radial (dr), tangential (dR), hydrothermodynamic (due to density differences at different layers—thermoclines—in the liquid because of different temperatures as one goes from zmin to zmax) and linear differentials facilitate a transport circuit for the liquid within seconds of applying the heat source, thereby dramatically increasing the total rate at which the total volume of liquid is heated by convective means.

Figure 2:
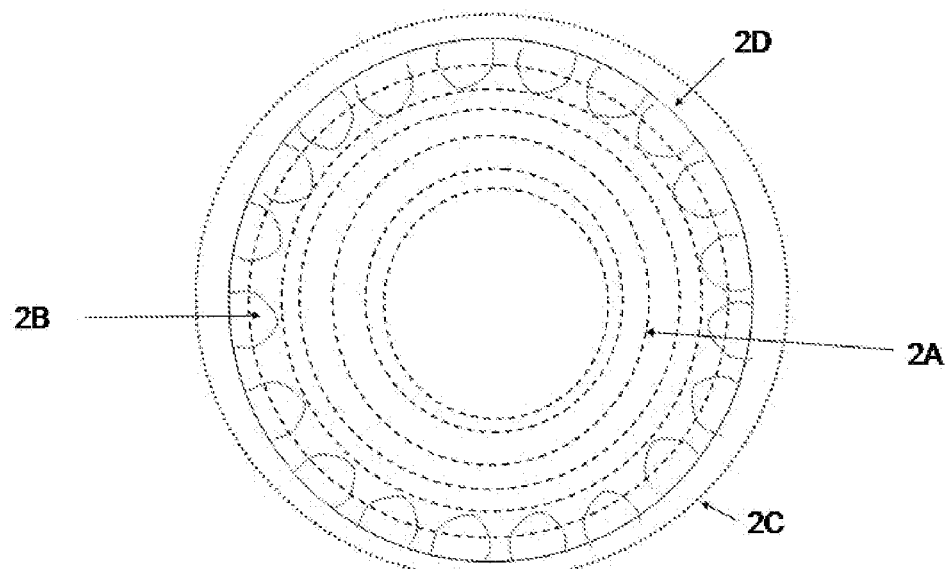
FIG. 2 depicts an illustrative view of exemplary convective pipes of a tea kettle in accordance with another embodiment of the present invention.

FIG. 2 depicts an illustrative view of exemplary convective pipes of a tea kettle in accordance with another embodiment of the present invention. As shown in the exemplary embodiment of the Figure, the convective pipes are shown in a spiral configuration, depicted along dashed lines 2A, as oriented along the z-axis. An entrance 2B for hot gases is provided, and an outer apron 2C acts to collect and control the flow of hot gases allowing heating by conduction (represented by the dotted line). The structural aspects are shown in relation to the wall of the containment vessel 2D.

In conducting an experiment with embodiments of the present invention, a tea kettle as described herein above was tested against randomly chosen commercially available tea kettle models to view boiling time of water when placed on a common heat source. As a result of such experimentation, the embodiment of the present invention demonstrated a dramatic improvement in boiling time—requiring only 61% as much time is needed to boil the same volume of water (a 39% increase in efficiency, depending on the bench mark chosen).

Figure 3:
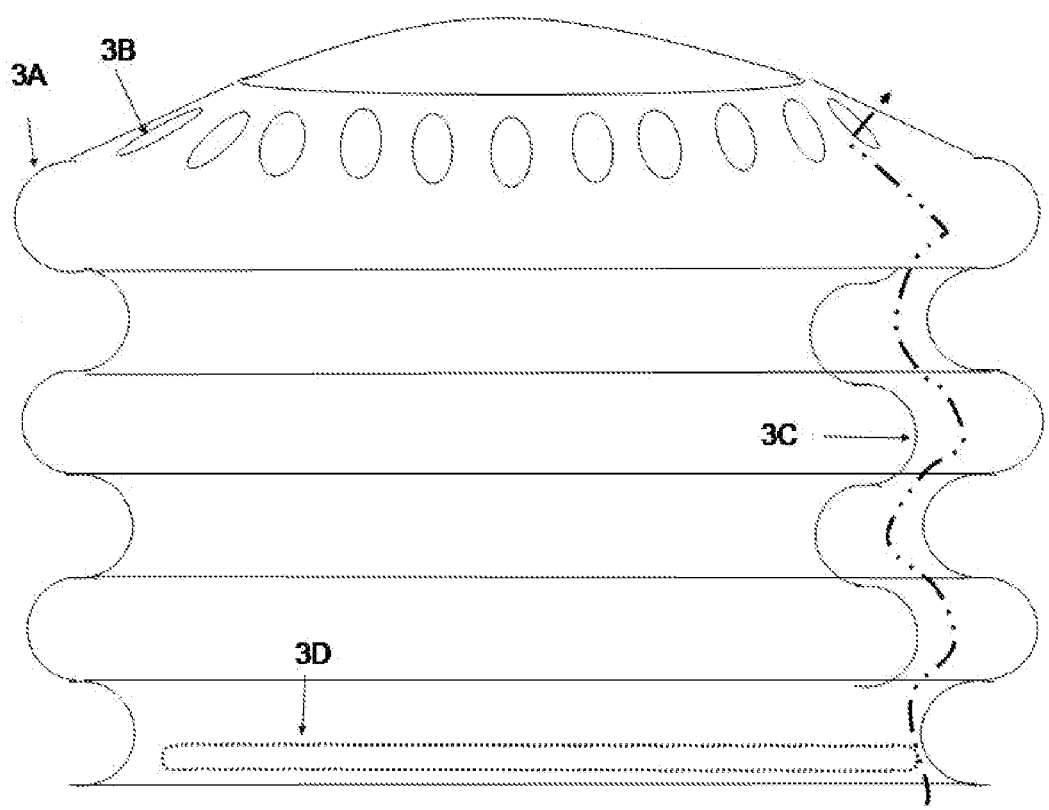
FIG. 3 depicts a partial cross-sectional view of a tea kettle in accordance with yet another embodiment of the present invention.

FIG. 3 depicts a cross-sectional view of a tea kettle in accordance with yet another embodiment of the present invention. In the embodiment shown, many of the components shown in FIG. 1 remain present, for example, the convective pipes (coil in the drawing) on the base of the kettle remain the same (3D shown in dotted line). Basic features, such as the spout and handle, are omitted for convenience, and only a voluminous container portion is shown.

In the alternative embodiment shown, deep curves in the inner wall of the tea kettle are utilized in lieu of the hot gas pipes shown in FIG. 1. By providing such a feature, the apron (i.e., surface of the curves) mimics the hot gas pipes creating a channel that forces the hot gases onto the increased surface area of the containment vessel and exit out of the vent holes 3B.

In such an embodiment, a similar result of increased heating efficiency may be achieved with decreased commercial costs as no welding or complex manufacturing may be needed. Welding processes add considerable cost to the manufacturing process, as tooling, materials, increased quality control and energy demands all contribute to a slower, more cost-intensive per-unit product. In the embodiment shown, merely press-fitting or crimping is needed to fuse the outer skin (i.e., side wall) to the inner skin.

In many embodiments, the curves or "fingers" 3A are designed about a $\cos(nz)$ function, where n is the depth (amplitude) of the function optimized for the total volumetric dimensions of the kettle. At a minimum, the value of n should be high, such that the "fingers" reach somewhat deeply into the volume of the voluminous container. The overall function of the inner wall of the kettle, with this feature added, may approach a hyperbolic function (cosh(z)), since the surface area subsumed within the total shape of the containment vessel may be significantly greater than with a substantially smooth surface, yet the total mean volume is nevertheless approximately the same.

In certain embodiments, as shown in FIG. 3, the "fingers" are not necessarily parallel to the base. Rather, in one embodiment, they may approximate the slow turn of an Archimedes Screw (with a "pitch" periodicity along sin(z)=2π). Such a feature may impart angular momentum to the gases in their transport (again, shown a dash-dotted line in FIG. 3) which would increase both heat transfer and efficiency of the transfer to the entire interior volume of the voluminous container, again substantially improving conduction.

Furthermore, in some embodiments, the apron 3A may fitted to the contour of the walls 3C of the interior volume to control the hot gases such that increased contact to the interior volume may lead toward increased heat transfer through conduction through the walls 3C. In an experimental test, similar to the one described above, an approximately 28% to about 50% increase in efficiency was demonstrated with this design.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention are further scalable to allow for additional clients and servers, as particular applications may require.

What is claimed is:

1. A tea kettle comprising:
    a handle;
    a spout;
    a voluminous container having at least one passageway positioned about an outer surface of an inner containment wall of the voluminous container, for allowing a heated fluid to pass therethrough and conductively heat the inner containment wall;
    at least one pipe positioned against or proximate to a bottom surface of the voluminous container; and
    a plurality of inlet ports and a plurality of outlet ports between the pipe positioned against the bottom surface of the voluminous container and an interior volume of the voluminous container;
    wherein a first set of the inlet ports and outlet ports comprise a different height than a second set of the inlet ports and outlet ports.

2. The tea kettle of claim 1, wherein the passageway comprises a pipe positioned against or proximate to the outer surface of the inner containment wall.

3. The tea kettle of claim 2, wherein the at least one passageway comprises a plurality of pipes positioned against or proximate to the outer surface of the inner containment wall.

4. The tea kettle of claim 1, wherein the at least one pipe positioned against the bottom surface of the voluminous container comprises a substantially coiled pipe, a linear pipe, or a combination of linear and coiled segments.

5. The tea kettle of claim 1, further comprising a lid for covering an aperture into an interior volume of the voluminous container.

6. The tea kettle of claim 1, wherein the passageway extends between an inlet port proximate a bottom surface of the tea kettle and an outlet port, and follows a connection path.

7. A tea kettle comprising:
    a voluminous container comprising an inner containment wall having a surface comprising a plurality of curves, and an outer wall having a surface comprising a plurality of curves;
    wherein at least one passageway is defined between an outer surface of the inner containment wall and an inner surface of the outer wall, for allowing a heated fluid to pass therethrough and conductively heat the inner containment wall;
    at least one pipe positioned against a bottom surface of the voluminous container; and
    a plurality of inlet ports and a plurality of outlet ports between the pipe positioned against the bottom surface of the voluminous container and an interior volume of the voluminous container, wherein a first set of the inlet ports and outlet ports comprise a different height than a second set of the inlet ports and outlet ports.

8. The tea kettle of claim 7, further comprising a spout and a handle.

9. The tea kettle of claim 7, wherein the at least one pipe positioned against the bottom surface of the voluminous container comprises a substantially coiled pipe, a linear pipe, or a combination of linear and coiled segments.

10. The tea kettle of claim 7, wherein the plurality of curves on the outer wall designed about a cos(nz) function, where n is the depth of the function optimized for the total volumetric dimensions of the kettle.

11. The tea kettle of claim 10, wherein the overall function of the inner wall of the kettle approaches a hyperbolic function (cosh(z)).

12. The tea kettle of claim 7, wherein the curves on the outer wall are unparallel to a base of the tea kettle.

13. The tea kettle of claim 12, wherein the curves on the outer wall approximate an Archimedic Screw having a pitch periodicity along sin(z)=2π.

* * * * *